United States Patent
Terschluse

(10) Patent No.: US 7,764,698 B2
(45) Date of Patent: Jul. 27, 2010

(54) TRANSCEIVER

(75) Inventor: Markus Terschluse, Neubiberg (DE)

(73) Assignee: Lantiq Deutschland GmbH, Neubiberg (DE)

( * ) Notice: Subject to any disclaimer, the term of this patent is extended or adjusted under 35 U.S.C. 154(b) by 757 days.

(21) Appl. No.: 11/041,759

(22) Filed: Jan. 24, 2005

(65) Prior Publication Data

US 2005/0185670 A1    Aug. 25, 2005

(30) Foreign Application Priority Data

Jan. 26, 2004   (DE) .................. 10 2004 003 833

(51) Int. Cl.
*H04L 12/28* (2006.01)

(52) U.S. Cl. .................. 370/401; 370/419; 370/465

(58) Field of Classification Search .......... 370/355, 370/352, 401, 468, 395.4, 395.41, 395.21, 370/395.2, 398, 396, 386–389, 419, 420, 370/434–435, 437, 442, 443, 462
See application file for complete search history.

(56) References Cited

U.S. PATENT DOCUMENTS

| 5,842,111 A | 11/1998 | Byers | |
| 5,859,846 A * | 1/1999 | Kim et al. | 370/395.62 |
| 6,122,288 A * | 9/2000 | Dashiff et al. | 370/465 |
| 6,490,252 B1 * | 12/2002 | Riggan et al. | 370/237 |
| 6,584,123 B1 * | 6/2003 | Dashiff et al. | 370/498 |
| 6,952,420 B1 * | 10/2005 | Castellano | 370/395.6 |
| 2003/0099239 A1 | 5/2003 | Kim | |

FOREIGN PATENT DOCUMENTS

| CN | 1464691 | 12/2003 |
| WO | 03041316 | 5/2003 |

* cited by examiner

*Primary Examiner*—Chirag G Shah
*Assistant Examiner*—Nima Mahmoudzadeh
(74) *Attorney, Agent, or Firm*—Dicke, Billig & Czaja, PLLC

(57) ABSTRACT

A transmission and/or reception unit is provided. The transmission and/or reception unit includes a module for transmitting and/or receiving data over a multiplicity of channels and at least two interfaces, the multiplicity of channels being divided between the at least two interfaces. With such a transmission and/or reception unit, for example, flexible adaptation of DSL linecards with different granularities is possible.

24 Claims, 2 Drawing Sheets

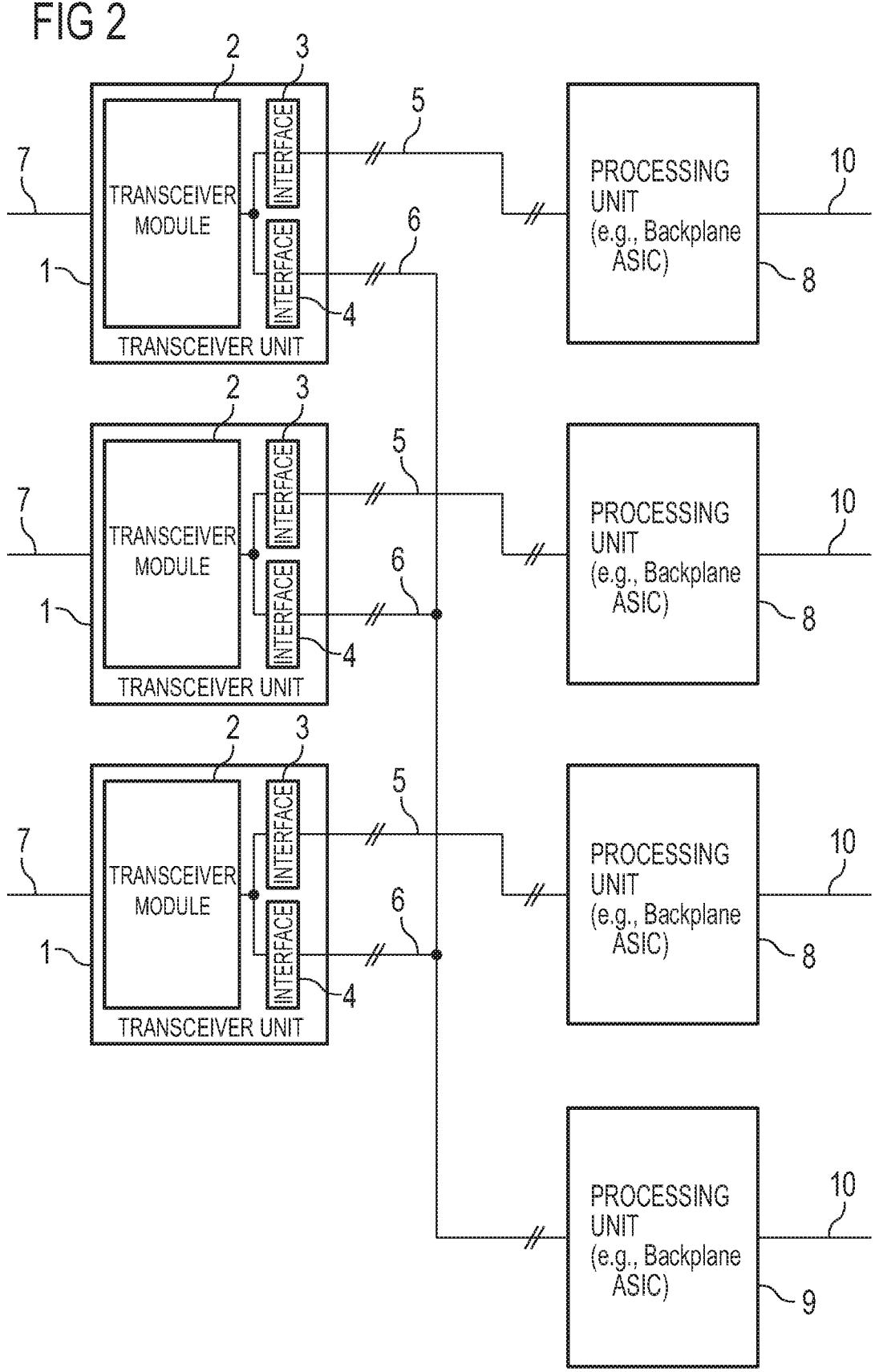

TRANSCEIVER

CROSS-REFERENCE TO RELATED APPLICATIONS

This Utility Patent Application claims priority to German Patent Application No. DE 10 2004 003833.3, filed on Jan. 26, 2004, which is incorporated herein by reference.

BACKGROUND

The present invention relates to a transmission and/or reception unit ("transceiver") in particular for transmitting and/or receiving DSL (digital subscriber line) data.

So-called DSL linecards, that is, transmission/reception devices, of a central office (CO) for DSL communication have different so-called granularities, that is, numbers of supported channels. Granularities of 8, 24, 32, 48, 64, or 96 are customary. Individual DSL chip sets have either 12 channels or 16 channels; the usual granularity of 48 therefore has to be divided into 48 (4×12) and 48 (3×16) depending on the DSL chip set on which the linecard in question is based.

In particular, there are ASICs (application-specific integrated circuits) for the processing of data received by a DSL transceiver, or data to be transmitted, which support precisely 12 channels on an interface for this DSL transceiver. The interface used is then customarily a UTOPIA interface according to the ATM Forum standard (ATM=asynchronous transfer mode).

FIG. 3 schematically illustrates such a chip set or DSL transceiver 11. A transceiver module 12 transmits or receives data signals over a transmission line 15 and delivers them at the back, that is, for processing, via an interface 13, for example a UTOPIA interface. A data line 14, which has 12 channels or 16 channels depending on the chip set being used, can be connected to this interface 13.

Owing to the situation described above, each manufacturer with a corresponding DSL chip set can address only some of the aforementioned granularities without overhead, that is, without unused channels. With 12-channel chip sets, it is possible to produce granularities of 24, 48 (4×12), 72 and 96 without overhead, and granularities of 32, 48 (3×16), 64 and 96 with a 16-channel chip set.

Conventionally, non-matching granularities are produced by implementing the next-highest possible channel number on the linecard and simply not using the unneeded channels. In order to build a 64-channel linecard with a 12-channel chip set, for example, the linecard is configured for 72 channels which gives an overhead of eight unused channels.

Overall, there is a great need for the granularities which can be produced by means of a 16-channel chip set. When using the aforementioned 12-channel ASICs, however, the problem arises that a 48-channel linecard cannot be built simply from three 16-channel chip sets or transceivers, since only 12 channels of an interface of the DSL transceiver in question can be used by each ASIC. A manufacturer of a 16-channel chip set must therefore use four transceivers to build such a 48-channel linecard, but with only 48 out of the theoretically available 64 channels then being used, that is to say there is an overhead of 16 channels whose production entails costs but which are not needed.

A transmission and/or reception unit in which the available channels can be used more flexibly is needed.

SUMMARY

In accordance with one embodiment of the invention, a transmission and/or reception unit is provided. The unit has a module for transmitting and/or receiving data over a plurality of channels, in which the transmission and/or reception unit has at least two interfaces assigned to the module, for extracting received data and/or for delivering data to be transmitted, the plurality of channels being divided between the at least two interfaces.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 2 illustrates a transmission and reception device with three transmission and reception units according to FIG. 1.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In one embodiment, the module is a transceiver module, in particular a DSL transceiver module. Generally speaking, the term module refers to a chip or a chip set, in particular a circuit encapsulated in a single package. In the case of a chip set, there is at least one single chip which is interconnected with the at least two interfaces.

There may in particular be 16 channels, one of the at least two interfaces being assigned 12 channels and another of the at least two interfaces being assigned 4 channels. The interfaces may in this case be UTOPIA interfaces.

In one embodiment of the present invention, the transmission and/or reception unit can be operated in a first operating mode and in a second operating mode, the at least two interfaces working as separate interfaces in the first operating mode and the at least two interfaces working as a combined interface in the second operating mode. This means that the at least two interfaces, so to speak, are internally or externally combined together into a single interface.

Flexible allocation of channels is possible with such a transmission and/or reception unit, and in particular different granularities can be produced without overhead. To this end, at least two of these transmission and/or reception units are used in a transmission and/or reception device, one of the at least two interfaces of each of the at least two modules being respectively connected to a common processing unit, such as an ASIC, whereas others of the at least two interfaces are respectively connected to their own such processing units.

Figure 1:
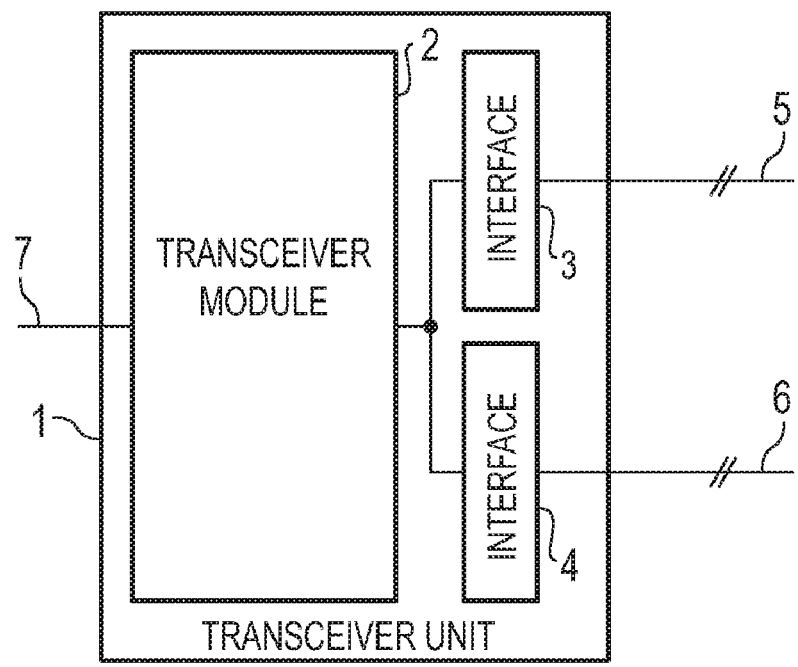
FIG. 1 illustrates a transmission and reception unit in accordance with one embodiment of the invention.
Figure 3:
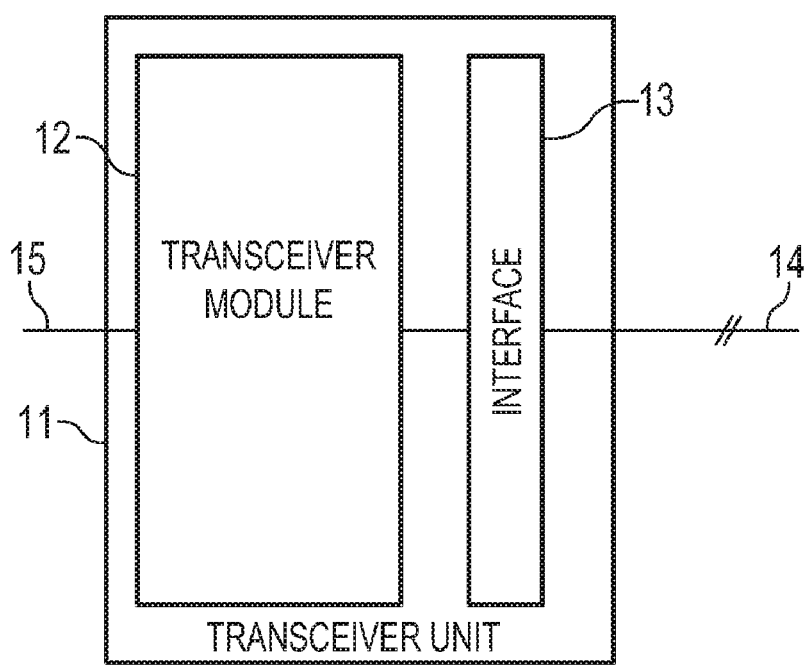
FIG. 3 illustrates a transmission and reception unit in accordance with the prior art.

FIG. 1 illustrates a transmission and reception unit 1 ("transceiver") according to one embodiment of the invention. Via a data line 7, data are transmitted over 16 parallel channels from a transceiver module 2, or received by it. The data of the individual channels may in principle be transmitted and received either over separate parallel lines or in any multiplex method over a single line. The transceiver module 2 delivers the received data to a first interface 3 and to a second interface 4, or receives the data to be transmitted via this first interface 3 or this second interface 4.

Twelve channels are in this case assigned to the first interface 3 and can be transmitted over first data lines 5 to further circuit units, or received from them. The second interface 4 is accordingly assigned 4 channels, the data of which can be delivered over second data lines 6 or received from other circuit parts.

If need be, such a transmission and reception unit may of course also be configured as a pure transmission unit or as a pure reception unit. A number of channels other than 16 and a different allocation of the channels to the interfaces is also conceivable, and there may likewise be more than two interfaces.

In one application of xDSL data communication, one embodiment of the transceiver module 2 is an xDSL transceiver module and the first interface 3 and the second interface 4 are so-called UTOPIA interfaces, an interface standard which is employed particularly in xDSL data transmission.

The first and second interfaces operate as separate interfaces in a first operating mode of the transmission and reception unit. There may also be a second operating mode, in which the first interface 3 and the second interface 4 are connected together, which leads to the case of a conventional 16-channel transmission and reception unit in the aforementioned embodiment.

FIG. 2 illustrates a transmission and reception device according to one embodiment of the invention, which shows how the problem described in the introduction of building a 48-channel linecard with 12-channel ASICs can be resolved by such a transmission and reception unit as represented in FIG. 1.

The device illustrated in FIG. 2 comprises three transmission and reception units 1, as were described with reference to FIG. 1. Four processing units 8, 9 are furthermore provided, for example the aforementioned ASICs which in this context are referred to as "backplane ASICs". Each of these processing units 8 is designed to process 12 channels.

As illustrated in FIG. 2, the first interface 3 of each transmission and reception unit 1 is respectively connected to one processing unit 8. The second interfaces 4 of the three transmission and reception units 1 are coupled together and connected to another processing unit 9, which in principle is configured exactly the same as the processing units 8. Each of the processing units 8, 9 is therefore responsible for 12 channels, and, with three transmission and reception units 1 each of which is configured for 16 channels, it is thereby possible to build a 48-channel linecard by using 12-channel ASICs.

In this case, the processing units 8, 9 are respectively masters on the interfaces 3 and 4, that is to say for example they set a rate at which data are transmitted over the interfaces 3, 4. The transceiver modules 2 are accordingly slaves in relation to these interfaces. With this configuration, a plurality of interfaces can then be assigned to a single processing unit (in the present example, the processing unit 9), but it is not possible to assign one interface to a plurality of processing units. In principle, a reverse configuration might also be conceivable.

Data lines 10 are then used for connecting the processing units 8, 9 to other circuits.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A transceiver unit comprising:
    a module for transmitting and receiving data over a plurality of channels;
    at least two interfaces assigned to the module for extracting received data and for delivering data to be transmitted;
    wherein the plurality of channels is divided between the at least two interfaces, wherein the transceiver is configured to be operated in a first operating mode and in a second operating mode, the at least two interfaces working as separate interfaces in the first operating mode and the at least two interfaces working as a single interface in the second operating mode; and
    wherein the transceiver is configured to respond to exterior control information to select the operating mode from one of the first operating mode and the second operating mode based on a fixed number of channels of a further unit to be connected to the transceiver unit.

2. The transceiver of claim 1, wherein the module is configured to transmit data over 16 channels.

3. The transceiver of claim 1, wherein the module is configured to receive data over 16 channels.

4. The transceiver of claim 1, wherein a first of the at least two interfaces is assigned 12 channels and a second of the at least two interfaces is assigned 4 channels.

5. The transceiver of claim wherein the at least two interfaces are UTOPIA interfaces.

6. The transceiver of claim 1, wherein the transceiver is designed for transmitting and receiving xDSL data.

7. The transceiver unit of claim 1, wherein in the first operating mode the at least two interfaces work to interface with two separate entities, and in the second operating mode the at least two interfaces work to interface with the same entity.

8. A transmission and reception device comprising:
    at least two transmission and reception units, each of said at least two transmission and reception units having a module for transmitting and receiving data over a plurality of channels;
    at least two interfaces assigned to the modules, for extracting received data and for delivering data to be transmitted, wherein the plurality of channels is divided between the at least two interfaces; wherein each transmission and reception unit is configured to operate the at least two interfaces as separate interfaces or as single interface based on a fixed number of channels of at least one further unit to be connected to the at least two transmission and reception units; and
    at least three processing units for processing data to be transmitted and received, wherein a first interface of the at least two interfaces of each transmission and reception unit is interconnected with a respective non-shared processing unit, and second interfaces of the at least two interfaces of each of the transmission and reception units are respectively interconnected with each other and with a common processing unit.

9. The transmission and reception device of claim 8, wherein the processing units comprise ASICs.

10. The transmission and reception device of claim 8, wherein the processing units are respectively designed for processing 12 channels.

11. The transmission and reception device of claim 8, wherein the at least three processing units are respectively masters in relation to control of the at least two interfaces, and the modules are respectively slaves in relation to the control of the at least two interfaces.

12. The transmission and reception device of claim 8, wherein the at least three processing units are equivalent processing units.

13. The transmission and reception device of claim 8, wherein the at least one further unit to be connected is the at least three processing units.

14. A communication unit comprising:
a module for transmitting data over a plurality of channels;
first and second interfaces assigned to the module for delivering data to be transmitted;
wherein the plurality of channels is divided between the first and second interfaces, wherein the communication unit is configured to be operated in a first operating mode and in a second operating mode, the first and second interfaces working as separate interfaces in the first operating mode and the first and second interfaces working as a single interface in the second operating mode; and
wherein the communication unit is configured to respond to exterior control information to select the operating mode from one of the first operating mode and the second operating mode based on a fixed number of channels of a further unit to be connected to the communication unit.

15. The communication unit of claim 14, wherein the module is further configured to receive data over the plurality of channels.

16. The communication unit of claim 15, wherein the first and second interfaces are further configured to deliver data.

17. The communication unit of claim 14, wherein the first interface is assigned 12 channels and wherein second interface is assigned 4 channels.

18. A communication unit:
a module for receiving data over a plurality of channels;
first and second interfaces assigned to the module for extracting received data;
wherein the plurality of channels are divided between the first and second interfaces, wherein the communication unit is configured to be operated in a first operating mode and in a second operating mode, the first and second interfaces working as separate interfaces in the first operating mode and the first and second interfaces working as a single interface in the second operating mode; and
wherein the communication unit is configured to respond to exterior control information to select the operating mode from one of the first operating mode and the second operating mode based on a fixed number of channels of a further unit to be connected to the communication unit.

19. The communication unit of claim 18, wherein the module is further configured to extract received data from the plurality of channels.

20. The communication unit of claim 19, wherein the first and second interfaces are configured to receive data.

21. The communication unit of claim 20, wherein the first interface is assigned 12 channels and the second interface is assigned 4 channels.

22. The communication unit of claim 21, wherein the communication unit is a transceiver module.

23. A transmission and reception device comprising: at least two transmission and reception units, each of said at least two transmission and reception units having a module for transmitting and receiving data over a plurality of channels;
at least two interfaces assigned to the modules, for extracting received data and for delivering data to be transmitted, wherein the plurality of channels is divided between the at least two interfaces; wherein each transmission and reception unit is configured to operate the at least two interfaces as separate interfaces or as a single interface based on a fixed number of channels of at least one further unit to be connected to the at least two transmission and reception units; and
at least three processing units for processing data to be transmitted and received, wherein a first interface of the at least two interfaces of each transmission and reception unit is interconnected with a respective processing unit, and second interfaces of the at least two interfaces of each of the transmission and reception units are respectively interconnected with each other and with a common processing unit, wherein the at least three processing units are equivalent processing units.

24. The transmission and reception device of claim 23, wherein the at least one further unit to be connected is the at least three processing units.

* * * * *